United States Patent
Lepori et al.

[11] Patent Number: 6,043,329
[45] Date of Patent: Mar. 28, 2000

[54] ACRYLIC COPOLYMERS

[75] Inventors: Agostino Lepori, Fagnano Olona Varese, Italy; Stefan Pieh, Leonding, Austria; Manfred Akstinat, Zurich; Fritz Burkhardt, Oderburg, both of Switzerland

[73] Assignee: Cement Intellectual Property Ltd. (CIP), Bermuda

[21] Appl. No.: 09/055,960

[22] Filed: Apr. 7, 1998

[30] Foreign Application Priority Data

Apr. 7, 1997 [AU] Australia ............................ A 579/97

[51] Int. Cl.[7] .......................... C08F 28/02; C08F 216/12; C08F 220/26
[52] U.S. Cl. .................. 526/287; 526/288; 526/307.5; 526/312; 526/318.42; 526/320; 524/4; 524/5
[58] Field of Search ............................ 526/312, 318.42, 526/320, 287, 307.5; 524/4

[56] References Cited

U.S. PATENT DOCUMENTS

| | | |
|---|---|---|
| 4,473,406 | 9/1984 | Bradley et al. . |
| 4,495,243 | 1/1985 | Kishi ....................... 526/312 |
| 4,792,360 | 12/1988 | Pierce et al. . |
| 5,100,984 | 3/1992 | Bürge et al. . |
| 5,294,692 | 3/1994 | Barron et al. ..................... 526/312 |
| 5,369,198 | 11/1994 | Albrecht et al. . |
| 5,385,971 | 1/1995 | Sauer et al. . |
| 5,612,396 | 3/1997 | Valenti et al. . |

FOREIGN PATENT DOCUMENTS

| | | |
|---|---|---|
| 0 331 308 | 9/1989 | European Pat. Off. . |
| 0 402 563 | 12/1990 | European Pat. Off. . |
| 0 549 280 | 6/1993 | European Pat. Off. . |
| 0 601 536 | 6/1994 | European Pat. Off. . |
| 0 610 699 | 8/1994 | European Pat. Off. . |
| 41 42 388 | 7/1992 | Germany . |
| 2255096 | 10/1992 | United Kingdom . |

*Primary Examiner*—Tae Yoon
*Attorney, Agent, or Firm*—Wenderoth, Lind & Ponack, L.L.P.

[57] ABSTRACT

Copolymers which are obtainable by reacting acrylic monomers with monomers of the following formula:

$$R_4\text{—}O\text{—}R_5\text{—}CO\text{—}NH\text{—}R_6$$

wherein $R_4$ represents H or a group of the following formulae:

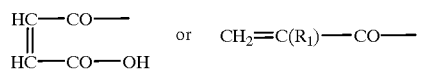

$R_5$ represents an oxyalkenyl group of the following formulae:

$$\text{—}(CHR_1\text{—}CH_2\text{—}O)_m\text{—} \quad \text{or} \quad \text{—}(CHR_1\text{—}CH_2\text{—}O)_{m_1}\text{—}(CH_2\text{—}CH_2\text{—}O)_n\text{—}$$

$R_6$ represents a $C_1$- to $C_8$-alkyl group, a $C_5$- to $C_7$-cycloalkyl group, or a phenyl group. The copolymers are very useful as additives or admixtures for improving the properties of construction materials and of dispersions.

6 Claims, No Drawings

ACRYLIC COPOLYMERS

1. DESCRIPTION OF THE INVENTION

The present invention relates to new acrylic copolymers and polymer compositions and their use as dispersants in the preparation of aqueous suspensions of inorganic materials such as cements, clays, talc, lime, calcium carbonate, silicates, calcium sulfate (anhydrous, Hemihydrate, or Dihydrate), ceramic slurries. The new copolymers are very effective in hydraulic cements as superplasticizers capable to impart an extended excellent workability to such mixtures with low air-entraining effect and to reduce the slump loss over a long period of time.

2. THE STATE-OF-THE-ART

Dispersants are useful in preventing settling, deposition, precipitation, agglomeration, flocculation, coagulation, adherence or caking of solid particles in a fluid medium. In aqueous medium, effective dispersants cause the solid particles to repell each other, inhibit their agglomeration or settling and influence the rheology.

The use of organic polymeric dispersants for the preparation of aqueous suspensions of inorganic materials is well known. Various polymeric compositions have been tested. Details of such products, by types and trademarks, are given, e. g., in "Dispersants"—Kirk-Othmer Encyclopedia of Chemical Technology—Fourth Edition 1993—Volume 8, page 302–303, published by John Wiley & Sons Inc.

Dispersants are also used in compositions based on cement such as concrete, mortars and cement pastes. Concretes are made with cement, coarse and fine aggregates and water. Mortars consist of cement, special graded sand and water, while a paste contains only cement and water. Many of the useful properties of cementitious compositions stem from chemical reactions between cement and water, which cause the transformation of the initial aqueous suspension into a rigid solid. Since this transformation is slow, the cementitious composition may be processed, transported, or poured into moulds. Water is one reactant of the hydration reactions of cement and an excess is normally used to obtain a good workability of such mixtures. Because of decreasing strength and increasing permeability, an excess of added water is unfavorable to the properties of the hardened cementitious products. Preparing cement-based mixtures, an effective dispersant reduces the water demand without changing the workability of such mixtures. In cement-concrete technology, dispersants usually are classified as "Chemical admixtures". Water reducers are chemical admixtures, capable of reducing the water requirement of mixtures by about 10 to 15% b.w. Superplasticizers (or High-Range-Water-Reducers) are chemical admixtures capable of reducing the water requirement by about 25–30% b.w. Known water reducers are based e. g. on salts of Lignosulfonic Acids, Hydroxicarboxylic Acids or processed Carbohydrates. Traditional superplasticizers are based on Sulfonated Naphthalene Formaldehyde polymers or Melamine Formaldehyde polymers. New types of superplasticizers are e.g. polycarboxylic polymers. A review of chemical admixtures is reported in "Effect of admixtures" Collepardi, M. and Ramachandran, V.S.—9th Int. Congr. Chem. Cem., 1992, page 529–568, by National Council of Chemical Building Material (New Delhi, India). Traditional superplasticizers impart a very good workability to fresh mixtures, but cannot maintain it for long periods. The workability decreases (hereinafter referred as "slump loss") dramatically already after 20–30 minutes. Initial workability can be restored by adding fresh water to those mixtures, but the characteristics with regard to mechanical strength and durability of this type of retempered cementitious compositions are poor. New superplasticizers reduce the "slump loss" effects by applying compositions containing polyoxyalkylene groups in the polymer chains. Examples of these compositions are claimed in European Patent Application 601536/A1 or in European Patent Application 610699/A1. Cement compositions with good workability have been also made adding a polymer of a Hydroxialkyl(meth)acrylate as superplasticizer, as claimed e. g. in U.S. Pat. No. 4,792,360 or in U.S. Pat. No. 4,473,406. The former patents suggest the use of an antifoaming agent during the preparation of a cement mixture, to eleminate air-entrainig effects of a superplasicizer. Entrained air is a drawback since it occurs in form of macrovoids of uncontrollabe size in hardened concrete or mortar reducing their mechanical properties.

The object of the present invention was therefore, to find additives for dispersions and for cement compositions without the above-mentioned disadvantages and which, especially in cementitious mixtures, show favorable workability development with time and low air-entraining effects. The acrylic copolymers of the present invention solve these problems by acting as superplasticizers in cementitious compositions imparting a good workability to such mixtures over a long period of time combined with low or without air entrainment.

3. SUMMARY OF THE INVENTION

The present invention relates to acrylic copolymers, which can be obtained by reacting one or more monomers selected from the group consisting of compounds of formulas I and II:

wherein each $R_1$ independently represents H or $CH_3$, $R_2$ represents H or a cation of Na, Li, ½ Ca or $C_1$- to $C_3$-alkylamine, $R_3$ represents a hydroxyalkyl group —$(CH_2)_xOH$ with x=2 to 10, with one or more monomers of formula III

wherein $R_4$ represents H or a group of the following formulas:

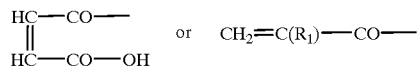

$R_5$ represents an oxyalkenyl group of the following formulas:

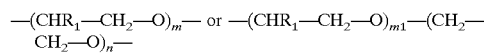

with m=15 to 30; m1=5 to 15 and n=2 to 6

$R_6$ represents a $C_1$- to $C_8$-alkyl group, a $C_5$- to $C_7$-cycloalkyl group, or a phenyl group, and optionally one or more monomers selected from the group consisting of compounds of formulas IV or V $CH_2=CR_1-R_7$      IV)

wherein $R_7$ represents a sulfonic group $-SO_3H$, or a phenyl sulfonic group $-C_6H_4-SO_3H$, or a 2-amido-2-methyl-1-propane sulfonic group of the following formula:

$-CO-NH-C(CH_3)_2-CH_2-SO_3R_2$ or a sulfoalkyl carboxylic ester group of the formula $-(CO)O-R-SO_3R_2$ with R respresenting a $C_1$- to $C_5$-alkyl group $CH_2=C(R_1)-CO-O-R_8-R_9$      V)

wherein $R_8$ represents a polyoxyethylene chain $-(-CH_2-CH_2-O-)_{n_1}-$ with $n_1$ being an integer from 2 to 50, $R_9$ represents H or $CH_3$.

These polymers are useful, e. g., as dispersants for aqueous suspensions of cements, clays, calcium carbonate, calcium sulfates (anhydrous, hemihydrate or dihydrate), talc, silicates, stone powders and porcelain slurries. More particularly they can be used in cementitious mixtures, such as concretes, mortars and cement pastes.

The invention further relates to a process of manufacturing of acrylic copolymers by the reaction of the monomers of formulas I and II with monomers of formula III, and optionally with monomers of formulas IV and V.

4. DETAILED DESCRIPTION OF THE INVENTION

Examples of the units represented by formula I include acrylic acid, methacrylic acid or crotonic acid and their alkali metal salts, alkaline earth salts, alkylamine salts and substituted alkylamine salts. The alkyl group of the alkylamine salt has preferably 1 to 3 carbon atoms. Examples of substituted alkylamines include monoethanolamine, diethanolamine and triethanolamine. Among them, alkali metal salts of methacrylic acid are preferred.

The monomers represented by formula II are acrylic or methacrylic monomers with hydroxialkyl substituents. Examples of such monomers are 2-hydroxyethyl acrylate, 2-hydroxyethyl methacrylate, 2-hydroxypropyl acrylate, 2-hydroxypropyl methacrylate. The most preferred is the 2-hydroxypropyl acrylate.

The units represented by formula III are preferably poly(oxyethylenepropylene)glycol mono urethanes or their (meth)acrylates, or alternatively mono maleate derivatives. The urethane group connects the strong hydrophobic and the more hydrophilic segments in the molecular structure of these units.

Examples of hydrophobic segments are alkyl or phenyl or cyclohexyl groups, while the hydrophilic segment may independently be oxyalkylene chains with oxypropylene or oxypropylene-oxyethylene repeating units. The number of the oxyalkylene groups constituting the chain varies from 15 to 30. The remaining hydroxyl group of the more hydrophilic segment can be reacted with maleic anhydride or with a (meth)acrylic functional group. The preferred unit of formula III is a poly(oxypropylene)glycol phenyl urethane or its monomaleate derivative. The preferred copolymers are reaction products of monoisocyanate-poly(oxypropylene)glycol-maleic anhydride with a molar ratio of about 1:1:1, or of monoisocyanate-poly(oxypropylene)glycol with a molar ratio of about 1:1. The preferred molecular weight of poly(oxypropylene)glycol is from about 200 to 5000, most preferred about 1000.

The units represented by formula IV are monomers with sulfonic acid end groups and their alkali metal salts, alkaline earth salts, alkylamine salts or substituted alkylamine salts, the same as described above for the units represented by formula 1. Examples of these monomers are vinyl sulfonic acid, 2-acrylamido-2-methyl-1-propanesulfonic acid (AMPS), 4-styrenesulfonic acid. Preferred is vinylsulfonic acid and AMPS.

The units represented by formula V are preferably poly(oxyethylene or oxypropylene)glycol mono(meth)acrylate or poly(oxyethylene or oxypropylene)mono methyl-ether-(meth)acrylate with molecular weights from about 200 to 2000. Most preferred is methoxy(polyoxyethylene)glycol methacrylate with an average molecular weigh of about 430 to 1000.

In the backbones of the copolymers, the main building blocks are the units of formulas I and II. The unit represented by formula III is very effective as air-detraining agent, when the copolymers of the invention are used in cementitious mixtures.

The molar ratios of the monomer units range from 30 to 79.95 mole %, preferred 40 to 65.95 mole % for units of formula I, from 20 to 69.95, preferred 30 to 55.95 mole % for units of formula II, from 0.05 to 2 mole %, preferred 0.05 to 1 mol % for units of formula III, from 0 to 5 mole %, preferred 3 to 5 mol % for units of formula IV, from 0 to 3 mole %, preferred 1 to 3 mole % for units of formula V.

The polymers according to the present invention can be prepared by known processes. An example is the radical polymerization, using water as a solvent. As solvents also methanol, ethanol, isopropanol, ethyl acetate, acetone, methyl ethyl ketone, methyl isobutyl ketone, benzene, toluene, xylene, aliphatic hydrocarbons, such as cyclohexane, n-hexane can be used. A water soluble polymerisation catalyst, such as a potassium or sodium or ammonium salt of persulfuric acid or hydrogen peroxide is preferred, when water is the solvent. For solvents other than water, the polymerization initiator can be selected e. g. among benzoyl peroxide, lauroyl peroxide, azo-bis-isobutyronitrile, azo-bis-2-methyl valeronitrile, dicyclohexylperoxidicarbonate, tert-butylperoxy-2-ethylhexanoate and butylperbenzoate. A polymerization accelerator may be used together with the initiator. Suitable e. g. is sodium hydrogensulfite, mercaptoethanol or sodium formaldehyde sulfoxylate. The polymerization reaction can be generally conducted at a temperature in the range of about 50 to 140° C., depending on the the boiling point of the selected solvents. When water is used, the more preferred range is about 70 to 100° C. The reaction time can vary over a wide range, depending on such factors as polymerization temperature, solvent and initiator concentrations. When using water as solvent and potassium persulfate as initiator at 95° C. for example, a reaction time of two to three hours is sufficient to obtain the claimed polymers. It is usually desirable to purge the reactor with nitrogen for a sufficient period to reduce the inhibition effect of the oxygen on the polymerization reaction. It is also preferred to conduct the polymerization under a continuous nitrogen blanket. In a preferred preparation method, the mixture of reactants is prepared by dissolving the reactive monomers in water, followed by pH adjustment with sodium hydroxide to approximately pH 5.5 to 6.5. Then the thus obtained aqueous mixture (preferably at room temperature) and the solution of polymerization initiator are gradually added, at a constant rate over 90 to 120 minutes, to the reactor containing water at 95° C. After the end of the initiator addition, the mixture is allowed to stand at, e. g. 95° C. for 15 minutes. The obtained acrylic polymer solutions are ready for use.

The claimed polymers can be used as additives or admixtures for improving the properties of construction materials. Thus, the present invention further relates to a process for improving the properties of construction materials, wherein polymers according to the invention are added to the construction materials. Preferred construction materials are, e. g. cementitous compositions. The term "hydraulic binders" is used herein in its ordinary sense and refers to any inorganic mixture, which sets and hardens when made into a paste with water. Examples of hydraulic binders include cementitious compounds like portland cements, alumina cements, fly ash, slags, any pozzolanic binder such as, silica fume, and any type of blended cement, and water-curable materials other then cement, such as gypsum, and/or mixtures of them. The acrylic copolymers of the present invention may be used together with known additives and/or known auxiliary materials for mortars, concretes or cement pastes. Examples of such additives include water reducing agents, fluidizing agents, high range water reducing agents, retarders, accelerators, air-entrainig agents, foaming agents, blowing agents, Theological additives, waterproofing agents. The formulation of cement mortars, concretes or pastes is not limited. The amount of the claimed acrylic copolymers applied to provide the desired effects of the present invention is typically 0.01–5 parts by weight, preferably 0.1–1.0 1,0 part by weight of acrylic polymers, calculated as dry matter in 100 parts of the dry construction material composition. The claimed acrylic copolymers can be dissolved in the blending water for the preparation of the cementitious composition or added to the already kneaded cement admixture. The invention further relates to construction materials, which contain one or more of the copolymers of the invention.

The acrylic copolymers of the present invention are also suitable as dispersing agents for, preferably aqueous slurries of inorganic mixtures other than cements. Thus, the invention further relates to the use of the copolymers according to the invention as additives or admixtures to improve the properties of dispersions, and to a process for improving the rheological properties of dispersions, wherein copolymers according to the invention are added to the dispersions. Preferred are dispersions of clays, talcum, lime, ceramic materials, calcium carbonate, calcium sulfate, silicates or mixtures of them. The invention further relates to dispersions, which contain one or more copolymers according to the invention as additives. The dispersions contain preferably 0.01 to 5% b.w., most preferred 0.05 to 1% b.w., of the copolymers according to the invention, calculated as dry matter referred to the dry inorganic components in the dispersion. The copolymers according to the invention mainly reduce the viscosity of, preferably aqueous, slurries based on e. g. clays, lime and talcum. It is necessary that the viscosity of the slurry is as low as possible during the preparation in order to afford ease of handling and application operations. The water demand of the aqueous slurries is reduced by the acrylic polymers, which are added in an amount ranging from e. g. 0.01 to 1% b.w. (as dry matter) referred to 100 parts of inorganic component. The acrylic polymer effect is thought to be based on the deflocculation of the small inorganic particles, preventing also their agglomeration.

5. EXAMPLES

The acrylic polymers of the present invention can be conveniently synthetized by many known polymerization methods. The present invention is explained by the following examples, which are given for illustrative purpose only and are not meant to limit the invention.

The following monomers were used in the examples:

AMA: Methacrylic acid (BASF), example for formula I

HPA: Hydroxypropylacrylate (BASF), example for formula II

VS: Vinyl sulfonic acid (Aldrich), example for formula IV

PPG Poly(oxypropylene)glycol (MW 1000) (SAPICI), example for formula V

PPO 1000: adduct Phenyl isocyanate—PPG (molar ratio 1:1), example for formula III PPO 1000 MA: adduct PPO 1000-Maleic anhydride (molar ratio 1: 1), example for formula III MPEG: Methoxy(polyoxyethylene)monomethacrylate (8 oxyethylene units). (Intern. Speciality Chemicals), example for formula V

Example 1

In a glass bottom-rounded reactor, equipped with mechanical stirrer, thermometer and reflux condenser, 500 g (0.5 mole) of poly(oxypropylene)glycol (average number of PO=17) are charged. Under stirring, the system is purged with nitrogen and heated up to 40° C. Then 59,5 g (0.5 mole) of phenylisocyanate are added dropwise during 15 minutes. After completion of the dropwise addition, the reaction system is raised to 85° C. and maintained at this temperature for 6 hours. About 550 g of an amber-coloured liquid are obtained, having a viscosity of about 940 mPa.s at 25° C. and being free of NCO-groups (Adduct A1).

Example 2

In a glass bottom-rounded reactor equipped with mechanical stirrer, thermometer and reflux condenser 500 g (0.5 mole) of poly(oxypropylene)glycol (average number of PO:17) are charged. Under stirring, the system is purged with nitrogen and heated up to 40° C. Then 59,5 g (0.5 mole) of phenylisocyanate are added dropwise during 15 minutes. After completion of the dropwise addition, the reaction system is raised to 85° C. and mantained at temperature for 6 hours. Then the temperature is decreased to 55° C. and 49 g (0.5 mole) of maleic anhydride are added. The reaction temperature is raised to 80° C. and is maintained at this temperature for 3 hours. About 590 g of a yellow liquid are obtained, with an acid number of 57 mg KOH/g of adduct, free of NCO-groups and with a viscosity of about 950 mPa.s at 25° C. (Adduct A2).

Example 3

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 4 g (0.0035 mole) of adduct A1, 31.4 g (0.785 mole) of sodium hydroxide in 200 g of deionized water.

The initiator solution is prepared by dissolving 3.5 g (0.013 mole) of potassium persulfate in 113.5 g of deionized water. The monomer and initiator solutions are added dropwise, simultaneously and separately during 90 minutes into the reactor. Then, another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g of a polymer solution with a pH of 6, a total solids content of 29.1% b.w. and a viscosity of about 195 mPa.s at 25° C. are obtained. (Acrylic Polymer B1).

Example 4

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 6 g (0.0054 mole) of adduct A1, 31.4 g (0.785 mole) of sodium hydroxide in 200 g of deionized water.

The initiator solution is prepared by dissolving 3.5 g (0.013 mole) of potassium persulfate in 113.5 g of deionized water. The monomer and initiator solutions are added dropwise, simultaneously and separately during 90 minutes into the reactor. Then, another initiator solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 775 g of a polymer with a pH of 5.9 , a total solids content of 29.3% b.w. and a viscosity of about 215 mPa.s at 25° C. are obtained (Acrylic Polymer B2).

Example 5

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 10 g (0.009 mole) of adduct A1, 31.4 g (0.785 mole) of sodium hydroxide in 200 g of deionized water.

The initiator solution is prepared by dissolving 3.5 g (0.013 mole) of potassium persulfate in 113.5 g of deionized water. The monomer and initiator solutions are added dropwise, simultaneously and separately during 90 minutes into the reactor. Then, another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 780 g of a polymer solution with a pH of 6, a total solids content of 28.7% b.w. and a viscosity of about 210 mPa.s at 25° C. are obtained (Acrylic Polymer B3).

Example 6

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 2 g (0.0016 mole) of adduct A2, 31.4 g (0.785 mole) of sodium hydroxide in 200 g of deionized water.

The initiator solution is prepared by dissolving 3.5 g (0.013 mole) of potassium persulfate in 113.5 g of deionized water. The monomer and initiator solutions are added dropwise, simultaneously and separately during 90 minutes into the reactor. Then, another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g of a polymer solution with a pH of 6, a total solids content of 28.5% b.w. and a viscosity of about 210 mPa.s at 25° C. are obtained (Acrylic Polymer B4).

Example 7

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 4 g (0.0033 mole) of adduct A2, 31.4 g (0.785 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g of a polymer solution with a pH of 6, a total solids content of 28.6% b.w. and a viscosity of about 220 mPa.s at 25° C. are obtained (Acrylic Polymer B5).

Example 8

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 6 g (0.005 mole) of adduct A2, 31.4 g (0.785 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g of a polymer solution with a pH of 5.9, a total solids content of 29.2% b.w. and a viscosity of about 210 mPa.s at 25° C. are obtained (Acrylic Polymer B6).

Example 9

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 110 g (0.846 mole) of hydroxypropyl acrylate, 10 g (0.008 mole) of adduct A2, 31.4 g (0.785 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g 0.0043 mole) of potassium persulfate in 37.8 g of deionized water is added dropwise to the reaction system during 30 minutes. After completion of the addition, the reaction system is maintained at 96° C. for 15 minutes. About 780 g of a polymer solution with a pH of 6, a total solids content of 28.7% b.w. and a viscosity of about 210 mPa.s at 25° C. are obtained (Acrylic Polymer B7).

Example 10

200 g of deionized water are charged into a glass bottom-rounded reactor fitted with a stirrer. Free oxygen is purged with nitrogen while stirring. The system is heated up to 96° C. A monomer solution is prepared by dissolving 118.8 g (1.381 mole) of methacrylic acid, 78.8 g (0.606 mole) of hydroxypropyl acrylate, 2.4 g (0.002 mole) of adduct A1, 41.4 g (1.035 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 780 g of a polymer solution with a pH of 6.1, a total solids content of 29.3% b.w. and a viscosity of about 225 mPa.s at 25° C. are obtained (Acrylic Polymer B8).

Example 11

200 g of deionized water are charged into a glass bottom-rounded reactor fitted with a stirrer. Free oxygen is purged with nitrogen while stirring. The system is heated up to 96° C. A monomer solution is prepared by dissolving 75.8 g (0.881mole) of methacrylic acid, 113.4 g (0.872 mole) of hydroxypropyl acrylate, 5.4 g (0.0044 mole) of adduct A2, 26.4 g (0.66 mole) of sodium hydroxide in 200 g of deionized water.

The initiator is prepared by dissolving 3.5 g (0.013 mole) of potassium persulfate in 113.5 g of deionized water. The monomer and initiator solutions are added, simultaneously and separately during 90 minutes dropwise into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 765 g of a polymer solution with a pH of 6.1, a total solids content of 28.2% b.w. and a viscosity of about 210 mPa.s at 25° C. are obtained (Acrylic Polymer B9).

Example 12

200 g of deionized water are charged into a glass bottom-rounded reactor fitted with a stirrer. Free oxygen is purged with nitrogen while stirring. The system is heated up to 96° C. A monomer solution is prepared by dissolving 80 g (0.93 mole) of methacrylic acid, 110 g (0.846 mole) of hydroxypropyl acrylate, 8.3 g (0.077 mole) of vinyl sulfonic acid, 4 g (0.0033 mole) of adduct A2, 26.4 g (0.66 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g a polymer solution with a pH of 1, a total solids content of 28.4% b.w. and a viscosity of about 170 mPa.s at 25° C. are obtained (Acrylic Polymer B10).

Example 13

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 100 g (0.769 mole) of hydroxypropyl acrylate, 10 g (0.023 mole) of methoxy (polyoxyethylen) monomethacrylate (with about 8 oxyethylene units), 6 g (0.0054 mole) of adduct A1, 31.4 g (0.785 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8g of deionized water is added dropwise to the reaction system during 30 minutes. After completion of the addition, the reaction system is maintained at 96° C. for 15 minutes. About 770 g of a polymer solution with a pH of 5.9, a total solids content of 29% b.w. and a viscosity of about 230 mPa.s at 25° C. are obtained (Acrylic Polymer B11).

Example 14

200 g of deionized water are charged into a glass bottom-rounded reactor fitted with a stirrer. Free oxygen is purged with nitrogen while stirring. The system is heated up to 96° C. A monomer solution is prepared by dissolving 90 g (1.046 mole) of methacrylic acid, 90 g (0.692 mole) of hydroxypropyl acrylate, 20 g (0.046 mole) of methoxy (polyoxyethylene)monomethacrylate (with about 8 oxyethylene units), 6.6 g (0.0054 mole) of adduct A2, 31.4 g (0.785 mole) of sodium hydroxide in 200 g of deionized water.

The initiator is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8g of deionized water is added dropwise to the reaction system during 30 minutes. After completion of the addition, the reaction system is maintained at 96° C. for 15 minutes. About 770 g of a polymer solution with a pH of 6.1, a total solids content of 28 per cent and a viscosity of about 200 mPa.s at 25° C. are obtained (Acrylic Polymer B12).

Comparative Example 200 g of deionized water are charged into a glass bottom-rounded reactor fitted with a stirrer. Free oxygen is purged with nitrogen while stirring. The system is heated up to 96° C. A monomer solution is prepared by dissolving 90 g (1.04 mole) of methacrylic acid, 110 g (0.846 mole) of hydroxypropyl acrylate, 31.3 g (0.784 mole) of sodium hydroxide in 200 g of deionized water. The initiator solution is prepared by dissolving 3.5 g (0.013 mole) of potassium persulfate in 113.5 g of deionized water. The monomer and initiator solutions are added dropwise, simultaneously and separately during 90 minutes into the reactor. Then another solution of 1.17 g (0.0043 mole) of potassium persulfate in 37.8 g of deionized water is added dropwise to the reaction system during 30 minutes. After completion of the addition, the reaction system is maintained at 96° C. for 15 minutes. About 770 g of a polymer solution are obtained, with a pH of 5.9, a total solids content of 27.3 per cent and a viscosity of about 160 mPa.s at 25° C. (Acrylic Polymer B13). The obtained polymer is not according to the invention, a monomer according to formula III is missing.

In table 1 the amount of applied monomers in mole %, in table 2 the solids content in % b.w., the pH and the viscosities (measured according to Brookfield at 25° C.) of the polymer solutions are summarized.

Application Examples Ex 1 to Ex 9

The acrylic polymers B2, B4, B5, B7, B8, B12 obtained in examples 4, 6, 7, 9, 10, 14 were applied as superplasticizers for cement based mortars. Mortar samples were prepared with Portland Cement (Normo 4—Rekingen, Holderbank AG) and sand (CEN STANDARD SAND EN 196-1-Normensand GmbH) in a Hobart type mixer, according to European Standard EN 196-1. The polymer/cement ratio was 0.002, the water/cement ratio was 0.50 and the sand/cement ratio was 3 (Application examples Ex 1 to Ex 7). The blanks were prepared without acrylic polymers and with a water/cement ratio 0.50 and 0.60 (Application examples Ex 8 and Ex 9). Immediatly after mixing, the fresh mortar was tested for bulk density and consistency (spread on flow table), according to European Standard EN 196-1. In order to evaluate the workability loss of the mortar, the consistency (flow table mesurement) was determined 30, 60 and 90 minutes after the initial mixing. The results are given in Table 3. As displayed in Table 3, the acrylic polymers of the present invention impart workability to a mortar composition over a long time, even when used in a reduced amount without affecting the compressive strength (measured according to EN-196-1). Also the entrained air is very low, whereby the bulk density of the mortar is inversely proportional to the amount of entrained air. The density is a factor affecting the workability of the mortar. Mixtures containing more air (low bulk density) have better workability. Surprisingly, the acrylic polymers of the invention allow the preparation of cementitious mixtures with a low air content and with good workability over a long time, in comparison to acrylic polymer B13 (comparative example without the claimed monomer composition in Application example Ex 7), which shows a very low bulk density (air entraining effect).

Application Examples Ex 10 to Ex 25

The acrylic polymers B1, B2, B3, B5, B6, B8, B9, B10, B11 and B12 obtained in examples 3, 4, 5, 7, 8, 10, 11, 12, 13, 14 were used as dispersants for aqueous suspensions of clays or talcum or calcium carbonate. According to Tappi Official Test Method T 648 om-88 (Viscosity of coating clay slurry), aqueous dispersions of clay (Superclay M from English China Clays-Application examples Ex 10 to Ex 14),or of talcum (Finntalc from Finnminerals OY—Application examples Ex 16 to Ex 19), or calcium carbonate (from OMYA Italia-Application examples Ex 21 to Ex 24) were prepared with introduction of the claimed acrylic polymers as dispersing agent. The dispersing properties of the tested acrylic polymers were evaluated using viscosimetric determinations of the so obtained slurry. The testing equipment was a low-shear viscosimeter (Brookfield Engineering Laboratories Inc.) operated at 20 and 100 rpm spindle speed. The results are given in Table 4, Table 5 and Table 6. When using the acrylic polymers according to the invention, the low-shear viscosity of the slurry is reduced (compared with slurries without acrylic polymers—Application examples Ex 15 for Superclay M, Ex 20 for talcum and Ex 25 for calcium carbonate).

TABLE 1

Composition of the Copolymers

| | | MONOMERS mole % | | | | | |
|---|---|---|---|---|---|---|---|
| Examples | Copolymer | AMA | HPA | VS | MPEG | PPO 1000 | PPO 1000MA |
| Comparative | B13 | 55.30 | 44.70 | — | — | — | — |
| 3 | B1 | 55.20 | 44.61 | — | — | 0.19 | — |
| 4 | B2 | 55.10 | 44.62 | — | — | 0.28 | — |
| 5 | B3 | 55.00 | 44.53 | — | — | 0.47 | — |
| 6 | B4 | 55.20 | 44.72 | — | — | — | 0.08 |
| 7 | B5 | 55.20 | 44.63 | — | — | — | 0.17 |
| 8 | B6 | 55.10 | 44.65 | — | — | — | 0.25 |
| 9 | B7 | 55.00 | 44.57 | — | — | — | 0.43 |
| 10 | B8 | 69.00 | 30.50 | — | — | 0.10 | — |

TABLE 1-continued

Composition of the Copolymers

| | | MONOMERS mole % | | | | | |
|---|---|---|---|---|---|---|---|
| Examples | Copolymer | AMA | HPA | VS | MPEG | PPO 1000 | PPO 1000MA |
| 11 | B9 | 50.00 | 49.50 | — | — | — | 0.50 |
| 12 | B10 | 50.10 | 45.60 | 4.10 | — | — | 0.20 |
| 13 | B11 | 56.70 | 41.70 | — | 1.30 | 0.30 | — |
| 14 | B12 | 58.40 | 38.70 | — | 2.60 | — | 0.30 |

AMA        Methacrylic acid
HPA        Hydroxypropylacrylate
VS         Vinyl sulfonic acid
PPG        Poly(oxypropylene)glycol (MW 1000)
PPO 1000   adduct Phenyl isocyanate-PPG (molar ratio 1/1)
PPO 1000MA adduct PPO 1000-Maleic anhydride (molar ratio 1/1)
MPEG       Methoxy (polyoxyethylene)monomethacrylate
           (8 oxyethylene units)

TABLE 2

Properties of Copolymer - Solutions

| Example | Copolymer | solids % | pH | Viscosity mPa · s (100 rpm Brookfield 25° C.) |
|---|---|---|---|---|
| Comparative | B13 | 27.3 | 5.9 | 160 |
| 3 | B1 | 29.1 | 6.0 | 195 |
| 4 | B2 | 29.3 | 5.9 | 215 |
| 5 | B3 | 28.7 | 6.0 | 210 |
| 6 | B4 | 28.5 | 6.0 | 210 |
| 7 | B5 | 28.6 | 6.0 | 220 |
| 8 | B6 | 29.2 | 5.9 | 210 |
| 9 | B7 | 28.7 | 6.0 | 210 |
| 10 | B8 | 29.3 | 6.1 | 225 |
| 11 | B9 | 28.2 | 6.1 | 210 |
| 12 | B10 | 28.2 | 6.1 | 170 |
| 13 | B11 | 29.9 | 5.9 | 230 |
| 14 | B12 | 28.0 | 6.1 | 200 |

Viscosity = Brookfield 25° C.

TABLE 4

Copolymers as Dispersants for Superclay M

| Application | | | | Viscosity mPa · s | |
|---|---|---|---|---|---|
| Example | Additive | P/S | Solids % | 20 rpm | 100 rpm |
| Ex 10 | B8 | 0.002 | 65.9 | 7400 | 5500 |
| Ex 11 | B2 | 0.003 | 66.2 | 12000 | 6200 |
| Ex 12 | B5 | 0.003 | 66.4 | 12750 | 5200 |
| Ex 13 | B9 | 0.003 | 66.7 | 12750 | 6200 |
| Ex 14 | B10 | 0.005 | 66.1 | 17300 | 6000 |
| Ex 15 | — | — | 60.0 | 30000 | 9200 |

Superclay M Clay from English China Clays
P/S Acrylic polymer (as dry matter)/Superclay M weight ratio
Viscosity Brookfield 20° C.

TABLE 3

Copolymers as superplasticizers

| Application Example | Additive | W/C | bulk density kg/m$^3$ | SPREAD | | | | C S | |
|---|---|---|---|---|---|---|---|---|---|
| | | | | zero mm | 30 min mm | 60 min mm | 90 min mm | 24 h N/mm$^2$ | 28 d N/mm$^2$ |
| Ex 1 | B2 | 0.50 | 2335 | 225 | 219 | 203 | 190 | 11.1 | 48.6 |
| Ex 2 | B4 | 0.50 | 2225 | 220 | 205 | 192 | 183 | 10.3 | 44.7 |
| Ex 3 | B5 | 0.50 | 2330 | 227 | 202 | 188 | 178 | 12.3 | 49.3 |
| Ex 4 | B7 | 0.50 | 2335 | 223 | 216 | 208 | 200 | 9.3 | 49.2 |
| Ex 5 | B8 | 0.50 | 2310 | 221 | 206 | 193 | 187 | 11.7 | 47.2 |
| Ex 6 | B12 | 0.50 | 2292 | 230 | 203 | 185 | 172 | 9.7 | 48.0 |
| Ex 7 | B13 | 0.50 | 1570 | 204 | 204 | 205 | 204 | 2.3 | 10.9 |
| Ex 8 | | 0.50 | 2280 | 177 | 168 | 160 | 150 | 14.4 | 48.9 |
| Ex 9 | | 0.60 | 2270 | 229 | 216 | 211 | 205 | 8.8 | 38.2 |

Cement  Normo 4 (Holderbank)
Sand    CEN
W/C     Water/Cement ratio
C S     Compressive strength

TABLE 5

Copolymers as dispersants for talcum

| Application Example | Additive | P/T | Solids % | Viscosity mPa · s 20 rpm | 100 rpm |
|---|---|---|---|---|---|
| Ex 16 | B8 | 0.005 | 66.3 | 2450 | 3500 |
| Ex 17 | B12 | 0.005 | 65.6 | 9500 | 6200 |
| Ex 18 | B6 | 0.005 | 65.3 | 9500 | 5200 |
| Ex 19 | B3 | 0.005 | 67.0 | 13000 | 6000 |
| Ex 20 | — | — | 56.2 | 12500 | 5100 |

Talcum Finntalc from FINNMINERALS OY
P/T Acrylic polymer (as dry matter)/Talkum weight ratio
Viscosity Brookfield 20° C.

TABLE 6

Copolymers as dispersants for calcium carbonate

| Application Example | Additive | P/CC | Solids % | Viscosity mPa · s 20 rpm | 100 rpm |
|---|---|---|---|---|---|
| Ex 21 | B1 | 0.005 | 70 | 103 | 210 |
| Ex 22 | B6 | 0.005 | 70 | 95 | 170 |
| Ex 23 | B11 | 0.003 | 70 | 420 | 336 |
| Ex 24 | B11 | 0.005 | 70 | 105 | 170 |
| Ex 25 | — | — | 65 | 23500 | 9500 |

Calcium carbonate OMYA 1V (OMYA Italia)
P/CC Acrylic copolymer (as dry matter)/Calcium carbonate, weight ratio
Viscosity Brookfield 20° C.

We claim:

1. Polymers obtained by reacting one or more monomers selected from the group consisting of compounds of formulae I and II:

$$CH_2=C(R_1)-CO-OR_2 \quad \text{I)}$$

$$CH_2=C(R_1)-CO-OR_3 \quad \text{II)}$$

wherein
  each $R_1$ independently represents H or $CH_3$,
  $R_2$ represents H or a cation of Na, Li, ½Ca or $C_1$- to $C_3$-alkylamine,
  $R_3$ represents a hydroxyalkyl group $-(CH_2)_xOH$ with x=2 to 10,
with one or more monomers of formula III $$R_4-O-R_5-CO-NH-R_6 \quad \text{III)}$$

wherein
  $R_4$ represents H or a group of the following formulae:

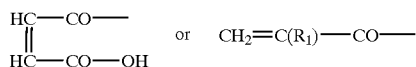

wherein
  $R_1$ represents H or $CH_3$,
  $R_5$ represents an oxyalkenyl group of the following formula:

$$-(CHR_1-CH_2-O)_m-$$

or $$-(CHR_1-CH_2-O)_{m1}-(CH_2-CH_2-O)_n-$$

wherein $R_1$ represents H or $CH_3$ and
with m=15 to 30, m1=5 to 15 and n=2 to 6
$R_6$ represents a $C_1$- to $C_8$-alkyl group, a $C_5$- to $C_7$-cycloalkyl group, or a phenyl group,
and optionally with one or more monomers selected from the group consisting of compounds of formulae IV or V $$CH_2=CR_1-R_7 \quad \text{IV)}$$

wherein
  $R_1$ represents H or $CH_3$ and
  $R_7$ represents a sulfonic group $-SO_3H$,
  or a phenyl sulfonic group $-C_6H_4-SO_3H$,
  or a 2-amido-2-methyl-1-propanesulfonic group of the following formula:

$$-CO-NH-C(CH_3)_2-CH_2-SO_3R_2$$

wherein $R_2$ represents H or a cation of Na, Li, ½Ca or $C_1$-$C_3$ alkylamine or a sulfoalkylcarboxylic ester group of the formula $$-(CO)O-R-SO_3R_2$$

with $R_2$ representing H or a cation of Na, Li, ½Ca or $C_1$-$C_3$ alkylamine and R representing a $C_1$- to $C_5$-alkyl group, $$CH_2=C(R_1)-CO-O-R_8-R_9 \quad \text{V)}$$

wherein
  $R_8$ represents a polyoxyethylene chain $$-(C-CH_2-CH_2-O-)_{n1}-$$

with n1 being an integer from 2 to 50,
  $R_9$ represents H or $CH_3$.

2. Polymers for use as additives or admixtures to improve the properties of construction material and for dispersions according to claim 1, wherein the unit of formula III is an adduct of monoisocyanate-poly(oxypropylene)glycol-maleic anhydride with a molar ratio of about 1:1:1, or an adduct of monoisocyanate-poly(oxypropylene)glycol with a molar ratio of about 1:1.

3. Polymers for use as additives or admixtures to improve the properties of construction material and for dispersions according to claim 2, wherein the molecular weight of poly(oxypropylene)glycol is from about 200 to 5000.

4. Polymers for use as additives or admixtures to improve the properties of construction material and for dispersions according to any one of claims 1 to 3, wherein the mole percentages of the monomers are:
  30 to 79.95 mole % for monomers of formula I;
  20 to 69.95 mole % for monomers of formula II;
  0.05 to 2 mole % for monomers of formula III;
  0 to 5 mole % for monomers of formula IV;
  0 to 3 mole % for monomers of formula V,
the total mole % being 100.

5. Polymers for use as additives or admixtures to improve the properties of construction material and for dispersions according to claim 4, wherein the mole percentages of the monomers are:
  40 to 65.95 mole % for monomers of formula I;
  20 to 55.95 mole % for monomers of formula II;

0.05 to 1 mole % for monomers of formula III;
3 to 5 mole % for monomers of formula IV;
1 to 3 mole % for monomers of formula V.

6. Process for the manufacture of polymers, wherein one or more monomers selected from the group consisting of compounds of formulae I and II:

$$CH_2=C(R_1)-CO-OR_2 \qquad \mathrm{I)}$$

$$CH_2=C(R_1)-CO-OR_3 \qquad \mathrm{II)}$$

wherein
   each $R_1$ independently represents H or $CH_3$,
   $R_2$ represents H or a cation of Na, Li, ½Ca or $C_1$- to $C_3$-alkylamine, and
   $R_3$ represents a hydroxyalkyl group $-(CH_2)_xOH$ with x=2 to 10,
are reacted with one or more monomers of formula III $$R_4-O-R_5-CO-NH-R_6 \qquad \mathrm{III)}$$

wherein
   $R_4$ represents H or a group of the following formulae:

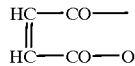 or $CH_2=C(R_1)-CO-$ wherein
   $R_1$ represents H or $CH_3$,
   $R_5$ represents an oxyalkenyl group of the following formulae:

$$-(CHR_1-CH_2-O)_m-$$

or $$-(CHR_1-CH_2-O)_{m1}-(CH_2-CH_2-O)_n-$$

wherein
   $R_1$ represents H or $CH_3$
with m=15 to 30, m1=5 to 15 and n=2 to 6
   $R_6$ represents a $C_1$- to $C_8$-alkyl group, a $C_5$- to $C_7$-cycloalkyl group, or a phenyl group, and optionally with one or more monomers selected from the group consisting of compounds of formulae IV or V $$CH_2=CR_1-R_7 \qquad \mathrm{IV)}$$

wherein
   $R_1$ represents H or $CH_3$ and
   $R_7$ represents a sulfonic group $-SO_3H$,
   or a phenyl sulfonic group $-C_6H_4-SO_3H$,
   or a 2-amido-2-methyl-1-propanesulfonic group of the following formula:

$$-CO-NH-C(CH_3)_2-CH_2-SO_3R_2$$

wherein $R_2$ represents H or a cation of Na, Li, ½Ca or $C_1-C_3$ alkylamine or a sulfoalkylcarboxylic ester group of the formula $$-(CO)O-R-SO_3R_2$$

with $R_2$ representing H or a cation of Na, Li, ½Ca or $C_1-C_3$ alkylamine and R representing a $C_1$- to $C_5$-alkyl group, $$CH_2=C(R_1)-CO-O-R_8-R_9 \qquad \mathrm{V)}$$

wherein
   $R_8$ represents a polyoxyethylene chain $$-(C-CH_2-CH_2-O-)_{n1}-$$

with n1 being an integer from 2 to 50,
   $R_9$ represents H or $CH_3$.

* * * * *